US008287054B2

(12) United States Patent
Beer

(10) Patent No.: US 8,287,054 B2
(45) Date of Patent: Oct. 16, 2012

(54) ELECTROHYDRAULIC CONTROL SYSTEM FOR THE ACTUATION OF AN ACTUATOR IN A MOTOR VEHICLE

(75) Inventor: Wilhelm Beer, Rüsselsheim (DE)

(73) Assignee: Continental Teves AG & Co. oHG (DE)

( * ) Notice: Subject to any disclaimer, the term of this patent is extended or adjusted under 35 U.S.C. 154(b) by 691 days.

(21) Appl. No.: 12/307,972

(22) PCT Filed: Jul. 3, 2007

(86) PCT No.: PCT/EP2007/056701
§ 371 (c)(1),
(2), (4) Date: Sep. 25, 2009

(87) PCT Pub. No.: WO2008/006742
PCT Pub. Date: Jan. 17, 2008

(65) Prior Publication Data
US 2010/0032597 A1 Feb. 11, 2010

(30) Foreign Application Priority Data

Jul. 12, 2006 (DE) .......................... 10 2006 032 516
Dec. 4, 2006 (DE) .......................... 10 2006 057 361
Jan. 30, 2007 (DE) .......................... 10 2007 004 494

(51) Int. Cl.
*B60T 13/74* (2006.01)

(52) U.S. Cl. ..................... 303/10; 303/115.4; 303/116.4

(58) Field of Classification Search .................... 303/10, 303/115.1, 115.2, 119.1, 119.3, 115.4, 116.4
See application file for complete search history.

(56) References Cited

U.S. PATENT DOCUMENTS

| | | | |
|---|---|---|---|
| 5,918,948 | A | 7/1999 | Burgdorf et al. |
| 5,988,774 | A * | 11/1999 | Jonner et al. ............... 303/189 |
| 6,149,247 | A | 11/2000 | Hofmann et al. |
| 6,188,947 | B1 * | 2/2001 | Zhan ............................... 701/71 |
| 6,220,675 | B1 | 4/2001 | Steffes |
| 6,428,121 | B1 | 8/2002 | Dinkel et al. |

(Continued)

FOREIGN PATENT DOCUMENTS

DE 30 30 175 A1 3/1981

(Continued)

*Primary Examiner* — Christopher Schwartz
(74) *Attorney, Agent, or Firm* — RatnerPrestia

(57) ABSTRACT

The invention relates to an electrohydraulic control system (1) for the actuation of at least one actuator (2-5), in particular a piston-cylinder assembly in a motor vehicle, having an assembly (7) comprising an electronic control unit (ECU), having an electric motor (8) which is activated by the electronic control unit (ECU) in order to drive a high pressure pump (9), and having a receiving body for receiving electrohydraulic valves (10-17), for receiving channels and for receiving the controllable high pressure pump (9) which is connected to a pressure transducer (27) and/or vessel (34) via a hydraulic connection (30, 31; 32, 33), and can also be connected to a pressure space of the actuator (2-5), in particular piston-cylinder assembly, wherein the electrohydraulic valves (10-17) and the electric motor (8) are networked to the electronic control unit (ECU), and wherein the electrohydraulic valves (10-17) are provided both for ventilating the high pressure pump (9) and for controlling the volume flow and/or pressure of the actuator (2-5).
The core of the invention is considered to be using the same pairs of electrohydraulic valves (10-17) in an electrohydraulic control system (1) for ventilating the high pressure pump (9) and for controlling the pressure at the actuator (2-5).

23 Claims, 11 Drawing Sheets

U.S. PATENT DOCUMENTS

| | | | |
|---|---|---|---|
| 6,446,435 B1 * | 9/2002 | Willmann et al. | 60/533 |
| 6,623,087 B1 * | 9/2003 | Wolff | 303/10 |
| 7,080,891 B1 * | 7/2006 | Hilberer | 303/6.01 |
| 7,204,566 B2 * | 4/2007 | Otomo et al. | 303/119.3 |
| 2004/0113488 A1 * | 6/2004 | Sekihara | 303/119.3 |
| 2005/0088039 A1 | 4/2005 | Yang | |
| 2006/0138860 A1 * | 6/2006 | Hinz et al. | 303/119.3 |

FOREIGN PATENT DOCUMENTS

| | | |
|---|---|---|
| DE | 40 00 837 A1 | 7/1991 |
| DE | 40 28 552 A1 | 3/1992 |
| DE | 41 27 040 A1 | 2/1993 |
| DE | 42 03 488 A1 | 8/1993 |
| DE | 195 17 604 A1 | 11/1995 |
| DE | 196 41 696 C1 | 12/1997 |
| DE | 196 38 920 A1 | 3/1998 |
| DE | 197 09 740 A1 | 9/1998 |
| DE | 198 25 114 A1 | 12/1999 |
| DE | 199 49 816 A1 | 4/2001 |
| DE | 195 80 786 B3 | 10/2005 |
| DE | 10 2004 014 171 A1 | 3/2006 |
| EP | 0 234 109 A2 | 9/1987 |
| EP | 0 889 815 B1 | 1/1999 |
| GB | 2 060 209 | 4/1981 |
| WO | WO 98/31576 | 7/1998 |
| WO | WO 00/46089 | 8/2000 |
| WO | WO 2006/100286 A1 | 9/2006 |

* cited by examiner

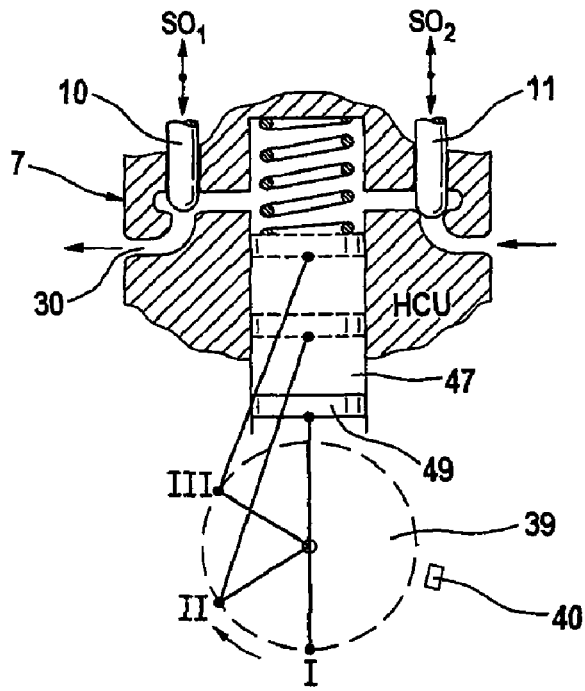
Fig. 12
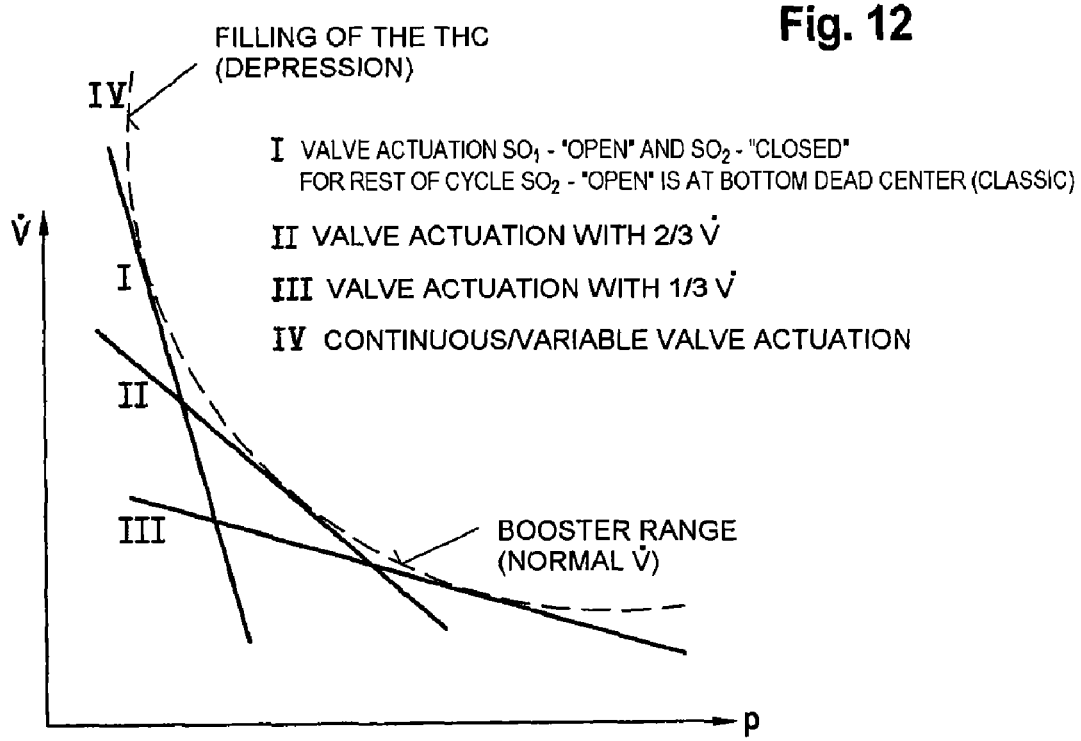

ELECTROHYDRAULIC CONTROL SYSTEM FOR THE ACTUATION OF AN ACTUATOR IN A MOTOR VEHICLE

CROSS REFERENCE TO RELATED APPLICATIONS

This application is the U.S. national phase application of PCT International Application No. PCT/EP2007/056701, filed Jul. 3, 2007, which claims priority to German Patent Application No. DE102006032516.8, filed Jul. 12, 2006, German Patent Application No. DE102006057361.7, filed Dec. 4, 2006, and German Patent Application No. DE2007004494.3, filed Jan. 30, 2007, the contents of such applications being incorporated by reference herein.

BACKGROUND OF THE INVENTION

1. Field of the Invention

The invention relates to an electrohydraulic control system for the actuation of an actuator in a motor vehicle. Systems of the generic type have an electrohydraulic control unit and convert electrical energy into mechanical work, or vice versa.

2. Description of the Related Art

Vehicle brake systems of the generic type have a high pressure pump and have nonreturn valves (inlet and outlet valves) for ventilating their expulsion space. An electromagnetically activatable inlet valve and an electromagnetically activatable outlet valve are provided for each wheel brake. In order to bring about a switching process in the intake and pressure paths of the high pressure pump between the antilock braking mode (feedback function) and autonomous pressure buildup (driving stability function), two additional electromagnetically activatable valves are provided per brake circuit (isolating valve TV and solenoid switching valve EUV). An isolating valve is used to disconnect a direct hydraulic connection between a pressure chamber of a pressure transducer (master brake cylinder) and an actuator (wheel brake). A switching valve makes it possible to feed pressure medium, with extraneous actuation, that is to say independently of human actuation, from a pressure chamber of the pressure transducer (or a tank, vessel or reservoir) in the direction of one or more actuators. Depending on the organization of the brake circuits in a brake system (for example diagonal or black/white division) and depending on the variant of the vehicle drive train (all wheel drive, front wheel drive or rear wheel drive) a total of 12 to 14 solenoid valves with corresponding boring in a receiving body have to be provided. This increases the costs for the boring and for the electromagnetically activatable valves. With the exception of rotational speed control which is partially performed by the electric motor, the consumption of energy or the loading on the vehicle's onboard electrical system is not taken into consideration. This procedure cannot be maintained for comfort-related additional functionalities such as, for example, an intervehicle distance controller, because it would lead to the scarce resources on offer being exhausted, and furthermore the assemblies would be unnecessarily heavily loaded in many load situations, with the result that the necessary interplay of loading cannot be complied with.

In quite general terms, in hydraulic systems a distinction is made between pressure control, volume flow control and power control. For the specific control of a delivered volume or of a supplied pressure in a high pressure pump it is possible to identify four basic methods of operation (cf. for example J. Ivantsyn; Hydrostatische Pumpen und Motoren [hydrostatic pumps and motors], 1st edition, 1993, Vogel Fachbuch Verlag).

In a first known control principle, the delivery capacity of an electromotively driven high pressure pump is controlled by controlling the rotational speed of the electric motor. In these systems, the electric motor has a mechanical operative connection to a hydraulic pump. The delivered volume flow depends on the rotational speed of the electric drive motor. The hydraulic pump does not have its own control systems with which the delivery flow, or the pressure, can be influenced. Stringent requirements are made of the electric motor. This is because it must be able to process both large volume flows with small load-side system pressures and small volume flows at high system pressures. The delivered volume flow is proportionate to the rotational speed of the electric motor, while the load-side system pressure is proportional to the torque applied by the electric motor. As a result, the electric motor of this electrohydraulic system is to be configured both in the direction of a high rotational speed and in the direction of a high torque. This increases the costs of the electric motors.

For this reason electrohydraulic systems in which the electric motor is operated at a constant rotational speed and in which a bypass is provided with a bypass valve have already been proposed. The delivered volume flow of the high pressure pump is controlled by adjusting the bypass valve. This principle requires the high pressure pump to continuously generate a desired volume flow which is then itself made available if no hydraulic work is to be carried out. As a result, the power loss increases, which is to be avoided in view of a strained situation of the vehicle's onboard electrical system and rising energy costs in a motor vehicle.

As a third solution, systems have been proposed in which the high pressure pump is mechanically coupled to a drive motor of a motor vehicle. The drive rotational speed of the high pressure pump is as a result dependent on the drive rotational speed of the motor vehicle. For this reason, corresponding measures have to be taken such that the high pressure pump itself can always make available the requested hydraulic power at low drive rotational speeds. The situation with comparably high drive rotational motor speeds is correspondingly reversed. In order to compensate for these disadvantages, a comprehensive mechanical adjustment capability of the high pressure pump has to be made available such as is the case, for example, by means of swash plates in air-conditioning compressors.

Finally, systems are known in which the delivery flow is controlled by an adjustable throttle on the intake volume flow, for example by means of an adjustable orifice. In this context, disadvantageous hydraulic effects such as, in particular, a noise nuisance or cavitation may occur.

An object of the present invention is to avoid the described disadvantages and to make available a simplified electrohydraulic control system which has an adjustable high pressure pump and which has an economic, compact design, consumption levels which spare resources and is also universally suitable for application outside a vehicle brake control system.

SUMMARY OF THE INVENTION

The object is achieved by means of one or more of the features of an electrohydraulic controller as disclosed hereinafter. The high pressure pump is self-priming and can be controlled and reversed by virtue of the fact that intake valves and pressure valves are embodied as electrohydraulically activatable control valves. In this context, a pressure sensor should be respectively provided on the intake side and on the pressure side downstream of the hydraulic valves (considered from the high pressure pump) with which the desired pressure value can be set on the basis of set point/actual value comparisons and on the basis of corresponding valve actuations.

The combination of one or more of the features of the invention makes it possible for the first time for the control valves to be responsible not only for the ventilation of an expulsion space of the pump but also for the pressure and direction control of the delivery flow. The invention permits simple control on the basis of the two valves. This measure permits simple boring of the receiving body. The number of necessary solenoid valves is significantly reduced.

These and other aspects of the invention are illustrated in detail by way of the embodiments and are described with respect to the embodiments in the following, making reference to the Figures.

BRIEF DESCRIPTION OF THE DRAWINGS

Refinements, developments and details of the invention emerge from the description with reference to the drawing, in which:

FIG. 12 shows a sketch clarifying different working strokes and operating conditions in a control system with a high pressure pump.

DETAILED DESCRIPTION OF THE PREFERRED EMBODIMENTS

A multi-circuit electrohydraulic control system 1 is described which is effective as a hydraulic booster and serves, in particular for by-wire actuation of at least one actuator 2, 3, 4, 5 in a motor vehicle. The system limit of the overall assembly is indicated by dashes in the sketch. The electrical signal flow between the electrical elements and a microcontroller is illustrated by dot-dash lines (for just one hydraulic circuit in order to maintain clarity). In principle, the described electrohydraulic control system is capable of replacing known pneumatic, electromechanical or hydraulic boosters, in particular brake booster 6. For example, a piston-cylinder assembly, such as in particular a wheel brake R1-R4 is used as the actuator 2, 3, 4, 5. The wheel brake R1-R4 should be actuated in principle independently of partial vacuum boosting by the pneumatic brake booster 6.

Figure 1:
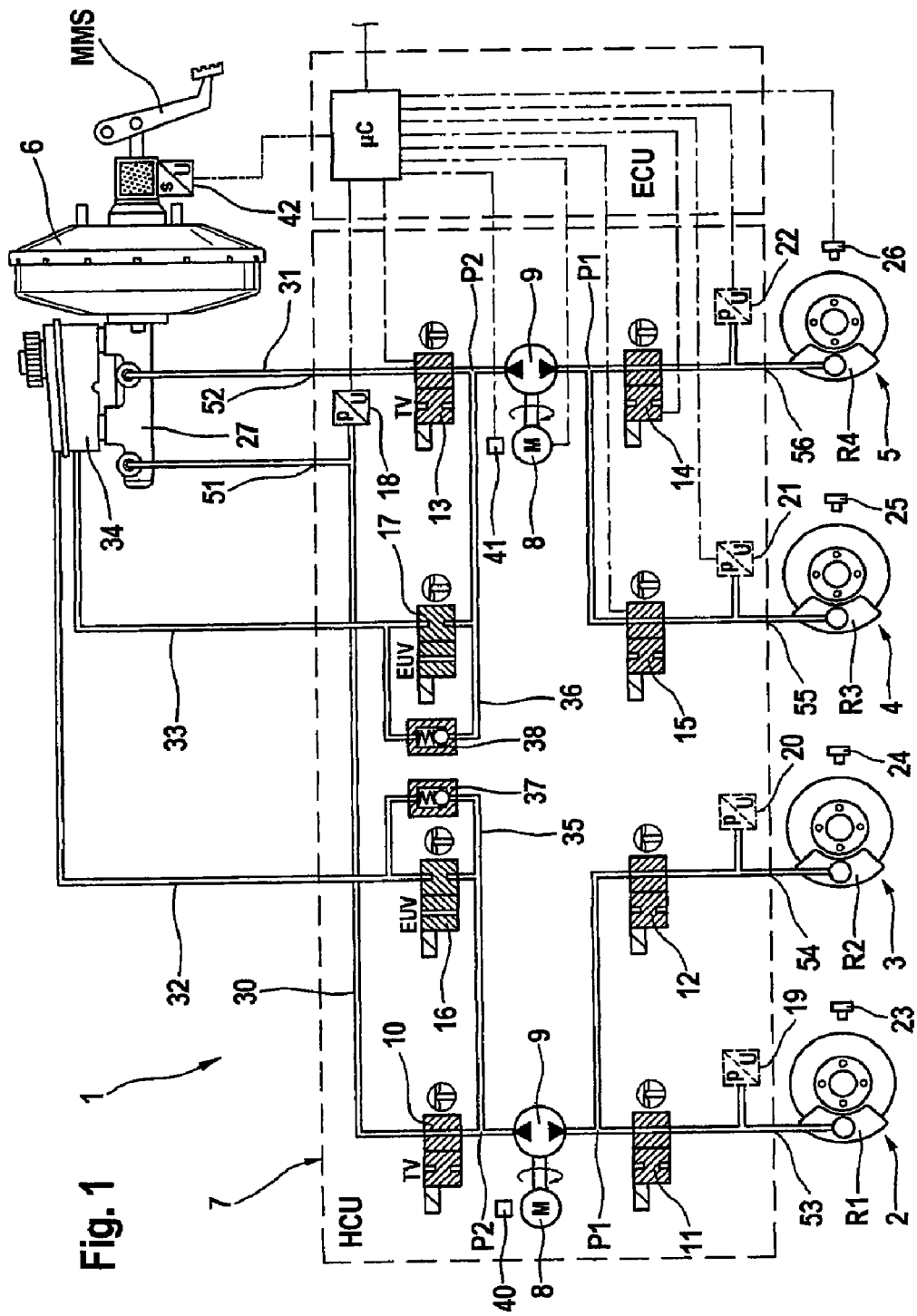
FIG. 1 shows a hydraulic circuit diagram of a hydraulic control system using the example of an open, dual-circuit brake control system.
Figure 2:
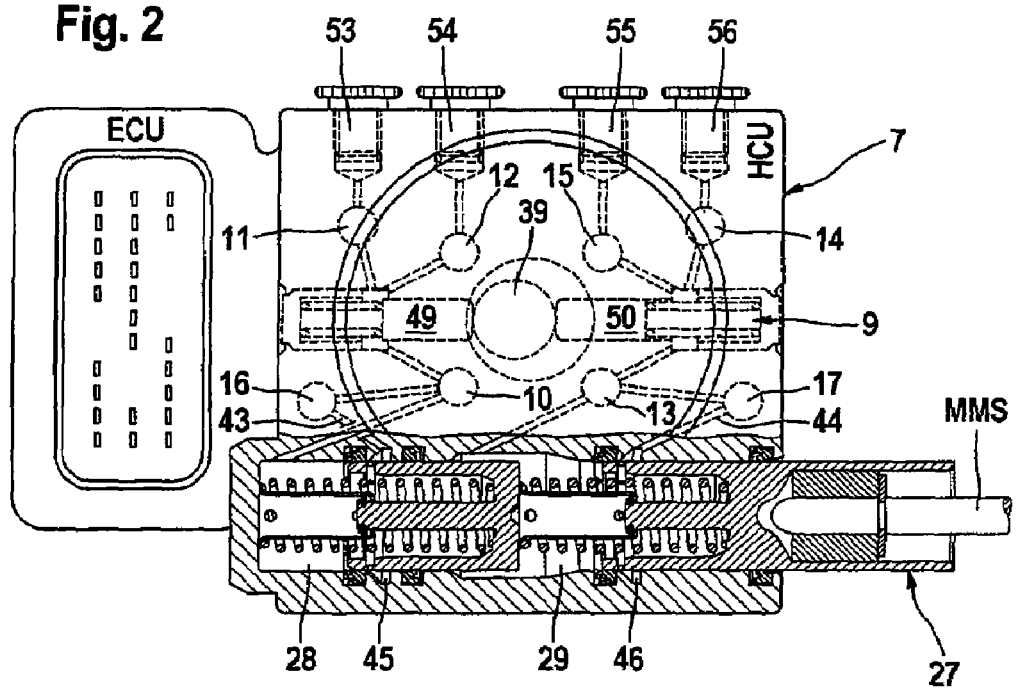
FIG. 2 shows a schematic section through an assembly with a receiving body for a brake control system with integrated master cylinder-simulator unit based on a circuit diagram according to FIG. 1 (8 valves)
Figure 3:
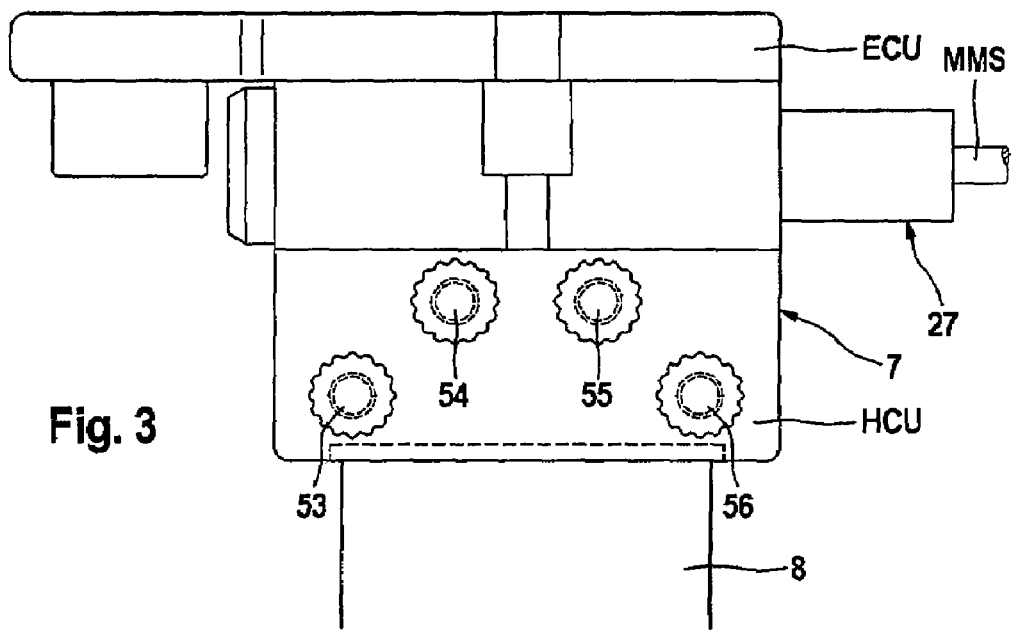
FIG. 3 shows a view of an assembly according to FIG. 2.

Using the example of a brake control system according to the circuit diagram in FIG. 1, such an electrohydraulic control system 1 as in FIGS. 2 and 3 comprises a block-shaped assembly 7 with an electronic control unit ECU containing electronic components such as, in particular, a microprocessor and valve coils connected thereto, a hydraulic control unit HCU and an electric motor 8 which is attached to the HCU which is connected electrically to the ECU and is actuated by it in order to drive a high pressure pump 9 of the hydraulic control unit HCU. The hydraulic control unit HCU accommodates, in the sense of a housing, the high pressure pump 9 which has a reversible delivery flow, six controllable valves 10-15 which are open in the currentless state and can be actuated electromagnetically, and two controllable valves 16, 17 which are closed in the currentless state, as well as channels for a total of two brake circuits. Furthermore, it is appropriate to arrange preferably five pressure sensing means 18-22 on or in the HCU in order to sense admission pressure and wheel brake pressure. As a result, it becomes possible, together with rotational information of wheel rotation sensors 23, 24, 25, 26, to carry out slip-controlled, wheel-specific brake pressure control.

The further description of the control system 1 will be provided only on the basis of one brake circuit because the respective other brake circuit is of identical design, with largely negligible exceptions, with the result that the features described below are provided in an identical way for both brake circuits.

For a currentless emergency braking mode, a pressure chamber 28, 29 of a pressure transducer (master cylinder) 27 is connected directly to, in each case, two wheel brakes R1-R2, organized in a brake circuit, via a line 30 which branches at a branching point P1. This provides a direct way of carrying out hydraulic actuation between the pressure transducer 27 and the actuator 2, 3. If, as in FIG. 1, the pressure transducer 27 is assigned a conventional, pneumatically operating brake booster 6, a servo booster (currentless) is available even in the case of a currentless emergency braking mode. However, it would be necessary to ensure that the brake booster 6 can act on the actuators 2, 3 only in the case of a fault. This can be achieved, for example, by means of a gap which has to be spanned in the actuation train.

Means and procedures for electrohydraulic by-wire actuation of one or more actuators 2-5, which may be embodied in particular as wheel brakes R1-R4, are described below.

Quite generally it is conceivable and possible to implement any actuation process or release process (braking process) of an actuator 2-5 by-wire, that is to say without direct hydraulic reaction on a pressure transducer 27, as it were using the hydraulic booster which is made available. On the other hand, it is conceivable to make use of this possibility only to a limited degree, for example with respect to selected control interventions (for example for traction control interventions and driving stability control interventions). If, for example, a pneumatic brake booster 6 has to be entirely dispensed with for whatever reason (lack of installation space, lack of vacuum supply), the described pressure source makes any actuation force available for the actuators 2-5 in accordance with a braking request sensed at the pressure transducer by sensor means (displacement sensor and/or force sensor). However, if a pneumatic brake booster 6 can be implemented, it can permit the above described servo assistance, in the sense of a redundant solution, even when there are faults in the hydraulic booster.

In order to control the pressure of each actuator 2-5 individually, according to FIG. 1 a valve 11-15 which is open in the currentless state is respectively connected upstream of each wheel brake R1-R4. The high pressure pump 9 is connected in the line 30 between the branching point P1 and a further branching point P2. In principle, the high pressure pump 9 operates with a constant but preferably variably controlled rotational speed of the electric motor 8. As is also described below, the high pressure pump 9 can be controlled and reversed, which means that its inlet and outlet can be turned (commuted) depending on the purpose of use.

The high pressure pump 9 is connected, starting from the branching point P2, to a pressure chamber of the pressure transducer 27 by means of the line 30, 31, and to a pressureless vessel 34 (reservoir, tank) by means of another line section 32, 33. In the line 30, 31, which leads to the pressure chamber, the controllable valve 10, 13 which is open in the currentless state and the pressure sensor 18 are respectively located. The valve 10, 13 which is open in the currentless state permits, in a blocked position, the line 30, 31 to be interrupted by disconnecting the pressure chamber from the actuators 2-5. The pressure sensor 18 permits an admission pressure which is applied on the actuation side in the line 30 to be sensed. A controllable valve 16, 17 which is closed in the currentless state is respectively arranged in each of the line sections 32, 33 which lead to the vessel 34. In order to provide improved safety in the event of malfunctions, the valve 16, 17 which is closed in the currentless state has, in its blocked position, a bypass 35, 36 which opens automatically as a function of pressure in the direction of the vessel 34 which allows it to reduce excessively high pressures of the high pressure pump 9 in the direction of the vessel 34. Said bypass 35, 36 is expediently provided with a nonreturn valve 37, 38 and integrated into the valve 16, 17 which is closed in the currentless state.

The described circuit diagram permits wheel-specific brake pressure control which is boosted electrohydraulically and protected against blocking in a brake circuit using a self-priming high pressure pump 9 and the three valves 10, 11, 12 which are open in the currentless state. In this context, the valves 10, 11, 12 are responsible both for the ventilation of the high pressure pump 9 and controlling the pressure of the wheel brake, which requires corresponding synchronization between them, as well as corresponding synchronization with a rotational angle of an eccentric drive of the high pressure pump 4 (expeller pump, preferably radial piston pump) and if appropriate with the rotational speed of the electric motor 8. The functional position of the valves 10-17 is known within the electronic control unit ECU, with the result that this information can be utilized for the synchronization without additional sensors or sensing means. The electric motor 8 has a given rotational direction in which rotational information (rotational speed/angular speed and/or instantaneous position setting/rotational angle setting, for example for detecting the top dead center or bottom dead center of an eccentric drive 39) of the motor 5 are directly measured or determined using suitable means (rotational speed sensor and/or position sensor 40, 41).

Particular pulsation damping means are not necessary. This is because if the pressure transducer 27 is disconnected and if an intake process of the high pressure pump 9 occurs from the vessel 34, this does not require any perceptible reactions at the pressure transducer 27 or the man/machine interface MMS in the normal braking mode. In contrast to conventional braking systems it is possible for volumetric elasticity in the form of a low pressure accumulator in the hydraulic line 30, 31 between the high pressure pump 9 and the wheel brakes R1, R2, R3, R4 to be dispensed with in each brake circuit. This is because excess fluid can be let off into the vessel 34. The overall size of the HCU is reduced through the elimination of the low pressure accumulator.

For driver-independent pressure increasing processes (traction control, driving stability control), the valve 16, 17 which is closed in the currentless state and is arranged in the line section 32, 33 in the direction of the vessel 34 is opened in order to take in while the high pressure pump 9 is running in the intake mode of an expeller piston, while the valve 10, 13 which is open in the currentless state and is arranged in the line 30, 31 in the direction of the pressure chamber is closed. Because of the disconnection of the pressure transducer 27, a driver of a vehicle also receives no comfort-reducing reaction in this actuation case. The specific pressure level in the actuators 2-5 (wheel brakes R1-R4) is controlled by controlling the controllable valves 11-14 which are open in the currentless state and are arranged on the wheel brake side.

The commutation of the high pressure pump takes place as follows. All the valves 10-17 are actuated by the electronic control unit ECU and are embodied as electrohydraulic control valves. This measure makes it possible, in contrast to conventional difference-pressure-controlled (that is to say positively controlled) pump nonreturn valves, to directly influence the intake processes and pressure processes of the delivery of the high pressure pump 9 in terms of the phase position of the eccentric drive 39 and as a function of the rotational speed of the motor 8. In other words, decoupling between the delivery flow, hydraulic pressure and the drive rotational speed is made possible with a constant drive power. In an expulsion stroke (after the bottom dead center), the valve which is on the desired pressure side remains open, while the valve which is on the intake side lying opposite is closed. For an intake stroke this occurs in a diametrically reversed fashion. Consequently, it becomes possible to reverse the delivery flow with any desired electrical control with a given drive power and so to influence it in terms of quantity and pressure without reversing the direction of rotation of the motor 8. The extensive electronic intervention possibilities also make it possible, for example, to influence the actuation behavior and the actuation characteristic of the activated actuators 2-5 in the ongoing process. It is particularly advantageous, for example for vehicle brake applications, if the high pressure pump 9 makes available a high volume flow with a low pressure in order to pre-fill the wheel brakes R1-R4 at the start of actuation, so as to change successively into a high pressure range with a reduced volume flow as the actuation process continues. This functionality makes it possible to automatically set a continuously reproducible, gentle braking process independently of a specific actuation characteristic by a driver of a vehicle, for the purpose of comfortable brake control, in which case the pressure can then nevertheless be increased in a highly dynamic fashion. This functionality can preferably be used for automatic inter-vehicle distance control (ICC). The valves 10-17 are multifunctionally effective, which reduces the complexity compared to the known assemblies 7. This is because they are used both to coordinate intake processes and expulsion processes of the high pressure pump 9 and for the specific pressure control in the actuator 2-5. As a result, improved, convenient actuation of the actuator with a reduced number of components is achieved.

Progressive electrification allows the assembly 7 to become principally integrated into a motor vehicle control system, in which case the electronic control unit ECU can be electronically networked with further electronic control units of the vehicle in order, for example, to contribute to avoidance of a collision through automatic, autonomous—that is to say driver-independent—increasing of pressure.

Furthermore the ECU is provided with a power output stage for supplying lower-voltage direct current or three-phase current to the electric motor 8, in which case these output stages can be provided together on a circuit board with a controller for the valves 10-17. The ECU can have, in particular, an electronic commutation device for the electric motor 8, with the electronic commutation device being provided integrated in the electronic control unit ECU.

The ECU is at least connected electrically to the wheel rotation sensors 23-26, the pressure sensors 18-22, the electric motor 8 and to coils of the valves 10-17, wherein at least one man/machine interface (pedal) with one or more sensors 42 can also be provided in order to sense a driver's request (pedal travel sensor or pedal pressure sensor) for the by-wire functions.

Between the electric motor 8 and the high pressure pump 9, a kinematic transducer, in particular a rot/trans transducer in the form of the eccentric drive 39 is provided. The high pressure pump 9 is embodied as an expeller pump with a reversible delivery flow and has, according to the embodiment, two hydraulic circuits which are independent of one another. Electronic-software-controlled synchronization means are provided which permit hydraulic commutation of the intake path and pressure path.

Although a single motor 8 is mentioned above, any brake circuit could contain a separate high pressure pump 9 with its own motor 8. In this regard, there is a serious difference from conventional brake assemblies in which a single motor is always provided for supplying energy to both brake circuits. Consequently, two motors 8 and two electric supply circuits would have to be provided for the two motors 8 within the ECU and, if appropriate, synchronization means for synchronization between these two motors 8.

As explained, in a further refinement of the invention the synchronization means are embodied in the form of software for valves 10-17 which can be closed-loop or open-loop controlled in an analogized fashion. The latter respectively have, in a basically known fashion, a valve seat and a closing body (illustrated as a pictogram in FIG. 1), wherein such seat valves can have, in addition to an open position and a closed position, at least one partially open position which permits improved controllability, with the result that in many instances the term used is control valves which can be closed-loop controlled in an analogized fashion. The synchronization means consequently permit variable ventilation, in particular control of the valves 10-17 with offset timing. The synchronization and the control frequency of the valves 10-17 are carried out by utilizing rotational information from the motor 8. This information is preferably acquired without a sensor by reading out a generator voltage or in a sensor-associated fashion by means of sensors 40, 41.

An assembly 7 according to aspects of the invention is predominantly suitable for activating actuators 2-5 for the purpose of controlling vehicle stability, for controlling brakes, for controlling the handbrake, for controlling steering, for controlling ride level, for controlling a manual shift transmission or automatic transmission, for relative adjustment of chassis components and/or for the combined networked control of the abovementioned functions. Further purposes of use in the field of automobiles are conceivable.

FIG. 2 is a partial illustration of a section through an assembly 7 with a bore according to the circuit diagram in FIG. 1 and a development with a pressure transducer (master cylinder) 27, including pressure rod, which is arranged integrated in the hydraulic control unit HCU. The pressure transducer 27 has two pressure chambers 28, 29 and two pistons for individually actuating the two brake circuits. On the wheel brake side and also with respect to the connection of the pressure chambers 28, 29, the bore is of identical design to the embodiment according to FIG. 6. In order to avoid unnecessary repetitions, reference is made to the description in this regard. The separate line 32, 33 in the direction of the vessel 34, which is characteristic of an open system, is implemented by a blind bore 43, 44 to a run-on space 45, 46 of the pressure transducer 27. The run-on space 45, 46 is hydraulically connected to the vessel 34. FIG. 3 illustrates a view of the assembly 7 according to FIG. 2.

Figure 4:
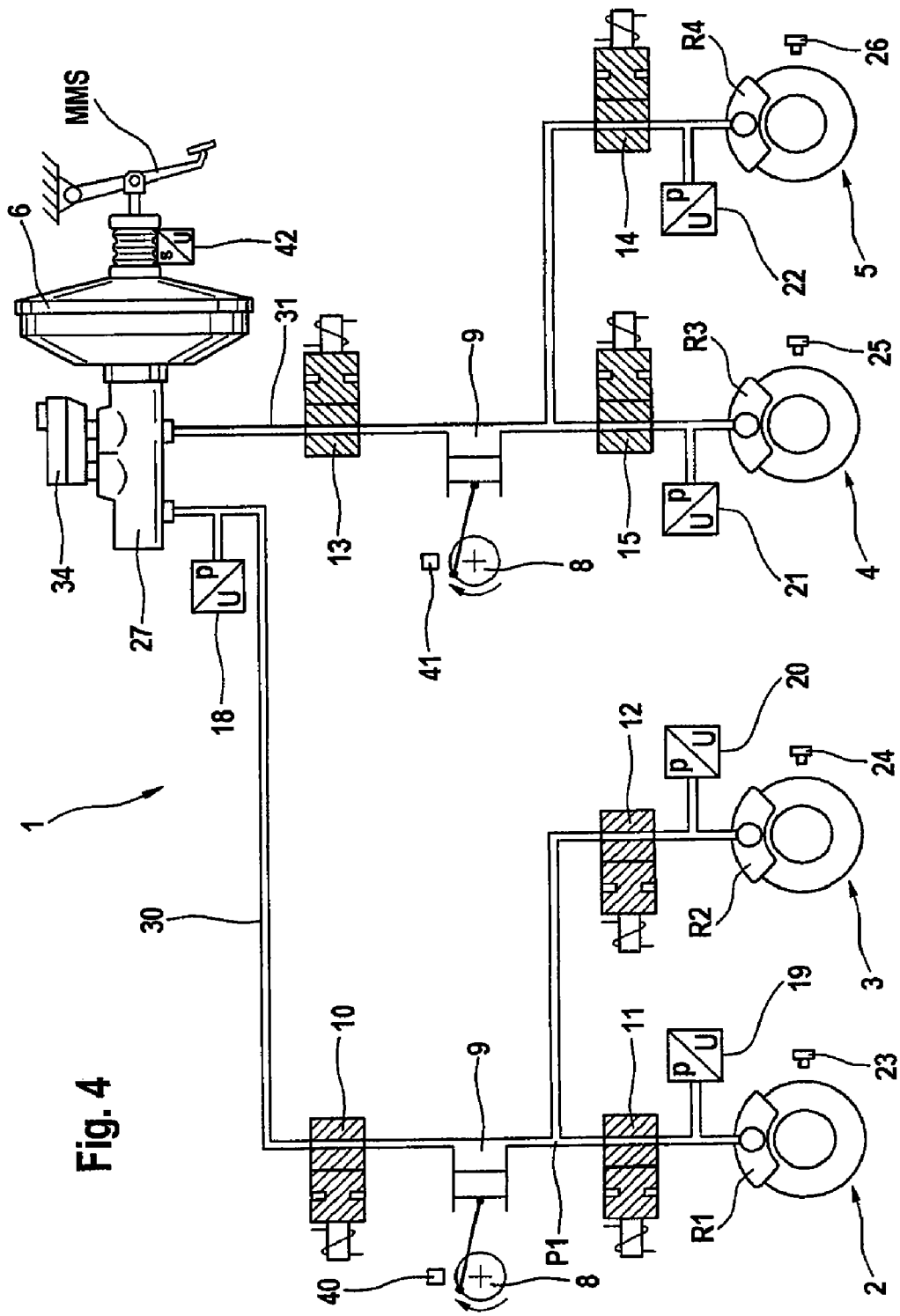
FIG. 4 shows a hydraulic circuit diagram of an embodiment using the example of a closed, dual-circuit brake control system.

FIG. 4 differs from FIG. 1 only in that a closed system is provided, in which a separate line section 32, 33 to a vessel 34 and a separate valve 16, 17 (EUV) which is closed in the currentless state in the respective line section 32, 33 is eliminated from each brake circuit. When an autonomous pressure increase which is independent of the driver occurs, an intake process always takes place from a pressure chamber 28, 29 of the pressure transducer 27. As a result of the synchronized activation of the valves 10-15, a driver of a vehicle is not provided with any perceptible reactions (vibration, noise), or only with small ones, relating to the vehicle control processes. Insofar as no simulator-like separation is provided between the man/machine interface MMS and the actuator 2-5, it is, however, possible for a shift at the man/machine interface MMS (pedal) to be perceptible. The system is particularly cost-effective and miniaturized compared to FIG. 1 because the components described above are eliminated.

Figure 5:
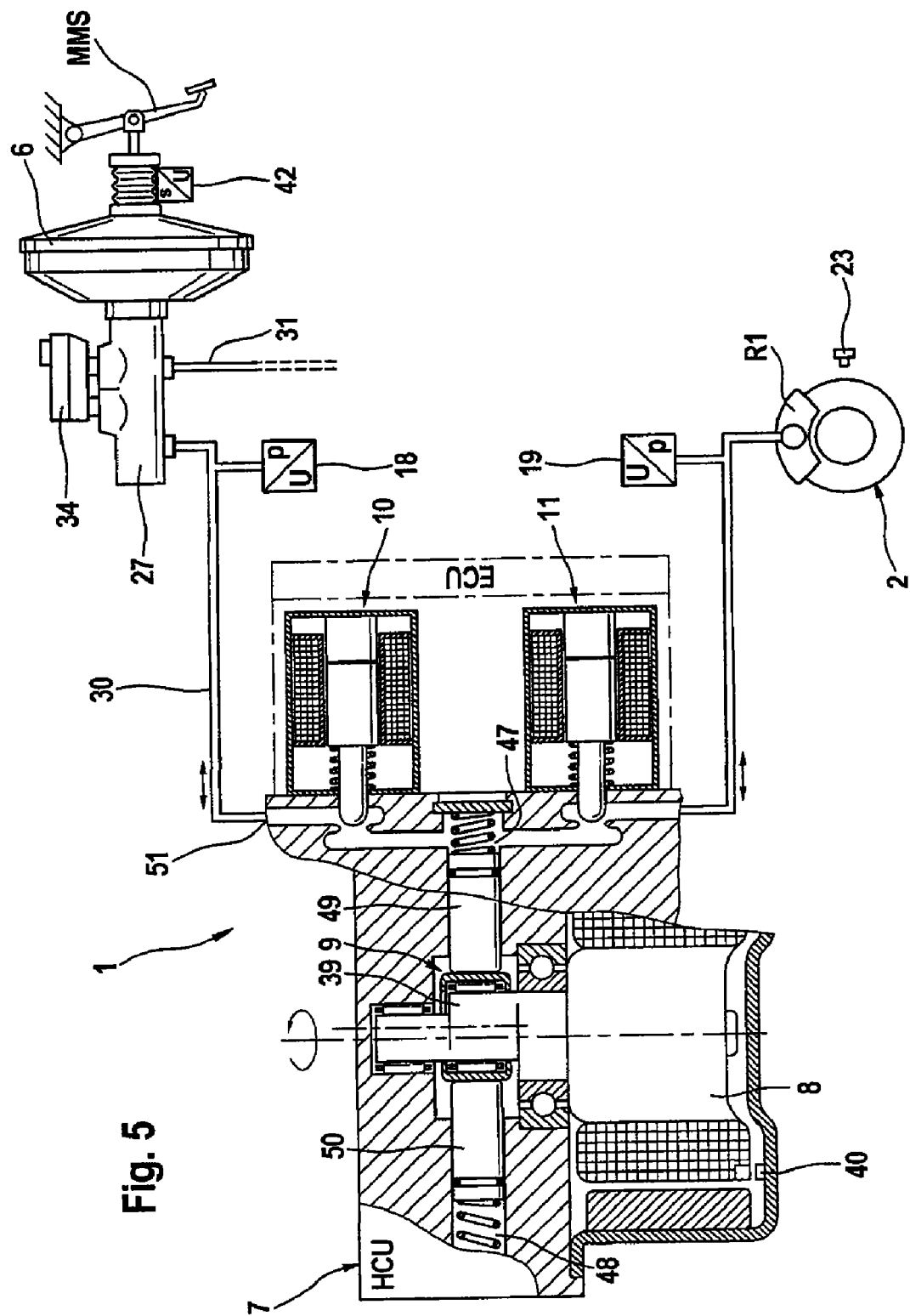
FIG. 5 shows a schematic and partially sectional view of a wheel brake branch of a brake control system according to FIG. 4.

FIG. 5 is a highly schematic illustration of just one part with a wheel brake R1 of the closed system according to FIG. 4, in which a pressure chamber 28 (not shown) of the pressure transducer 27 (master cylinder) is connected to an actuator 2 (wheel brake R1). The line 30 opens into an expulsion space 47, downstream of the valve 10, of the high pressure pump 9 which is provided integrated in the HCU. The assembly 7 which is partially illustrated in section also comprises the valve 11, the electric motor 8 with eccentric drive 39 for pump pistons 48, 49 which dip into expulsion spaces 47, 48, further, selectively provided components which correspond to the embodiments above and are therefore identified by identical reference numbers, and the electronic control unit ECU.

Figure 6:
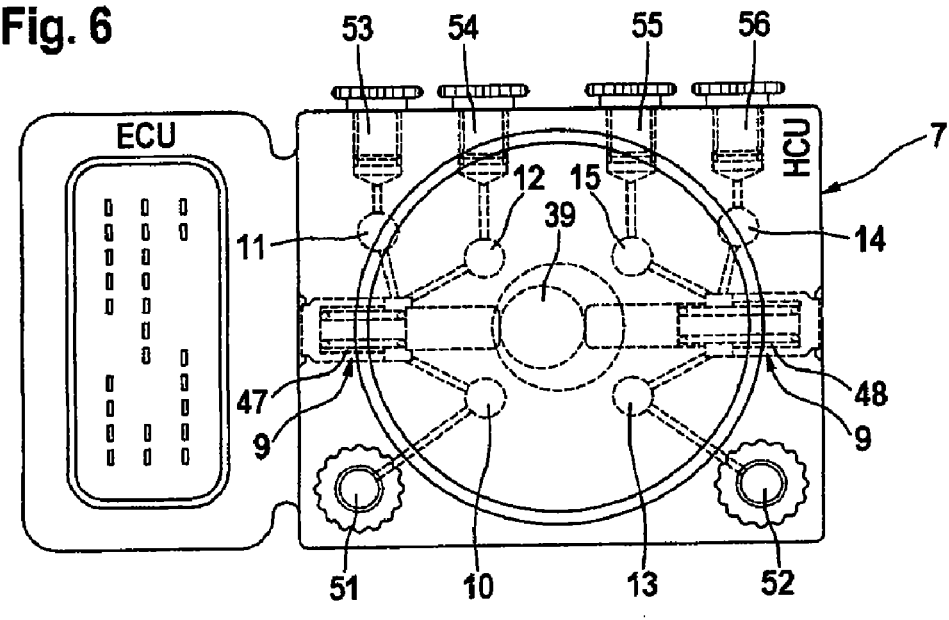
FIG. 6 shows a schematic view of an assembly having a boring concept of a receiving body for a brake control system according to FIG. 5 (6 valves)
Figure 7:
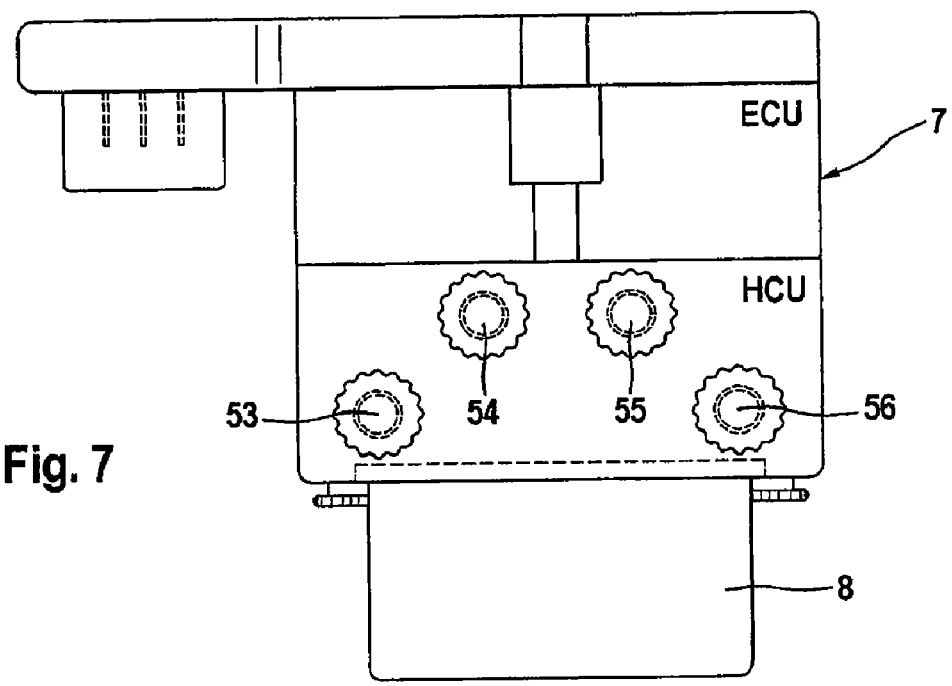
FIG. 7 shows a view of an assembly according to FIG. 6.

FIG. 6 permits, in a relatively schematic fashion, a view of the highly simplified bore and channel guidance according to aspects of the invention within an HCU (6 valves) which also correlates in principle to FIG. 4. In this context, it is clear that for each brake circuit there are pressure transducer connections 51, 52 which, after passing through the controllable valve, open into the expulsion space 47, 48 of the respective high pressure pump 9. Furthermore, wheel brake connections 53-56 are illustrated for wheel brakes R1-R4 which are organized in pairs and which each open into the respective expulsion space 47, 48 after passing through the valve 19-22. FIG. 7 shows a plan view of a connection side of an HCU according to FIG. 6 with the described wheel brake connections 53-56.

Figure 8:
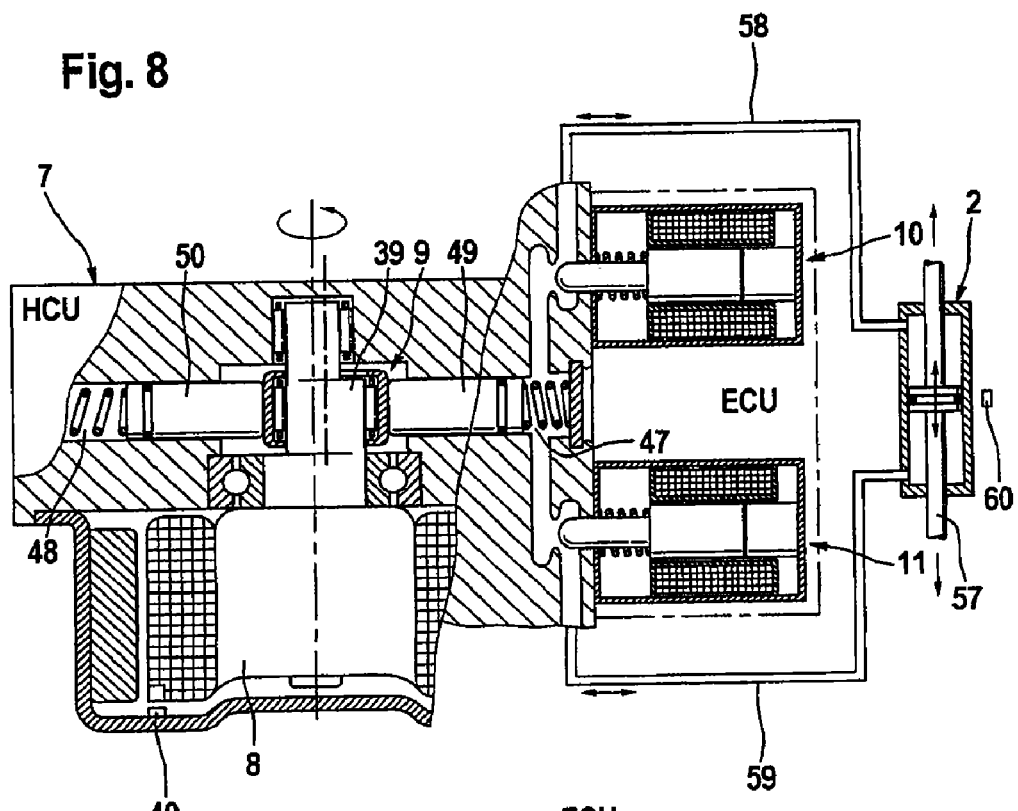
FIG. 8 shows a closed, electrohydraulic control system having an actuator, in a schematic and partially sectional view.

FIG. 8 illustrates a single-circuit application of an assembly 7 (two valves) in a way which is comparable to FIG. 5 for the purpose of supplying energy to a simple actuator 2 in the form of a piston-cylinder assembly, in which case no pressure transducer whatsoever is provided for a hydraulic intervention by an actuating person, and also no solenoid switching valves EUV are provided. A further schematically illustrated high pressure pump of the assembly 7 can be used to drive other actuators, and is ignored here. The actuator 2 is illustrated as a reversible piston-cylinder unit with a piston rod 57. In contrast to FIGS. 1-7, no vessel, tank or reservoir is provided but rather recirculation of the pressure medium takes place. In other words, the pressure medium which is, on the one hand, extracted from a pressure chamber of the actuator 2 is pushed into an opposite pressure chamber which is disconnected by the piston. For this purpose, the actuator 2 is connected by two lines 58, 59 to the expulsion space 47 of the high pressure pump 9. In addition to the rotational speed and/or rotational position sensor 40 on the electric motor 8 it is also possible for a travel sensing device 60 to be provided on the actuator 2. The pressure sensor system and wheel rotation sensor system can be eliminated.

FIG. 8 shows the basic proposal particularly clearly, at least just one pair of electrohydraulic valves 10, 11 (valve duo), which are controlled in a synchronized manner, has to be provided in each hydraulic circuit both for ventilating any high pressure (expulsion) pump 9 and for controlling the pressure of the actuator 2 with the result that different-pressure-controlled nonreturn valves for ventilating the high pressure pump 9 can be dispensed with. Insofar as further functionalities (extraneous actuation of a brake system) are necessary in an open system (FIG. 1), it is possible, in contrast, to speak of a valve quartet 10, 11, 12, 16; 13, 14, 15, 17 in each hydraulic circuit. In a closed system (FIG. 4) this is reduced in respect of a valve trio (10, 11, 12; 13, 14, 15).

Figure 9:
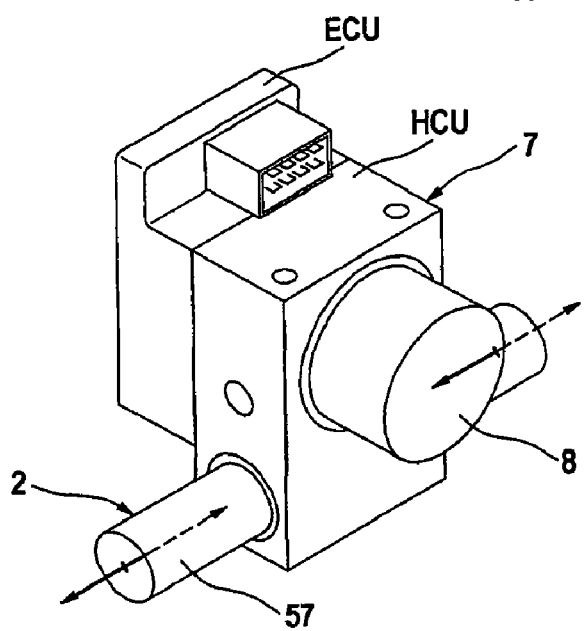
FIG. 9 shows a view of an assembly for a control system according to FIG. 8.

FIG. 9 illustrates, in three-dimensional view, a compact assembly 7 which is embodied in one piece and in which all the hydraulically effective components including the electrical and hydraulic lines and the actuator 2 are provided integrated within the assembly 7, and in which all the electronic components are provided within the electronic control unit ECU.

Figure 10:
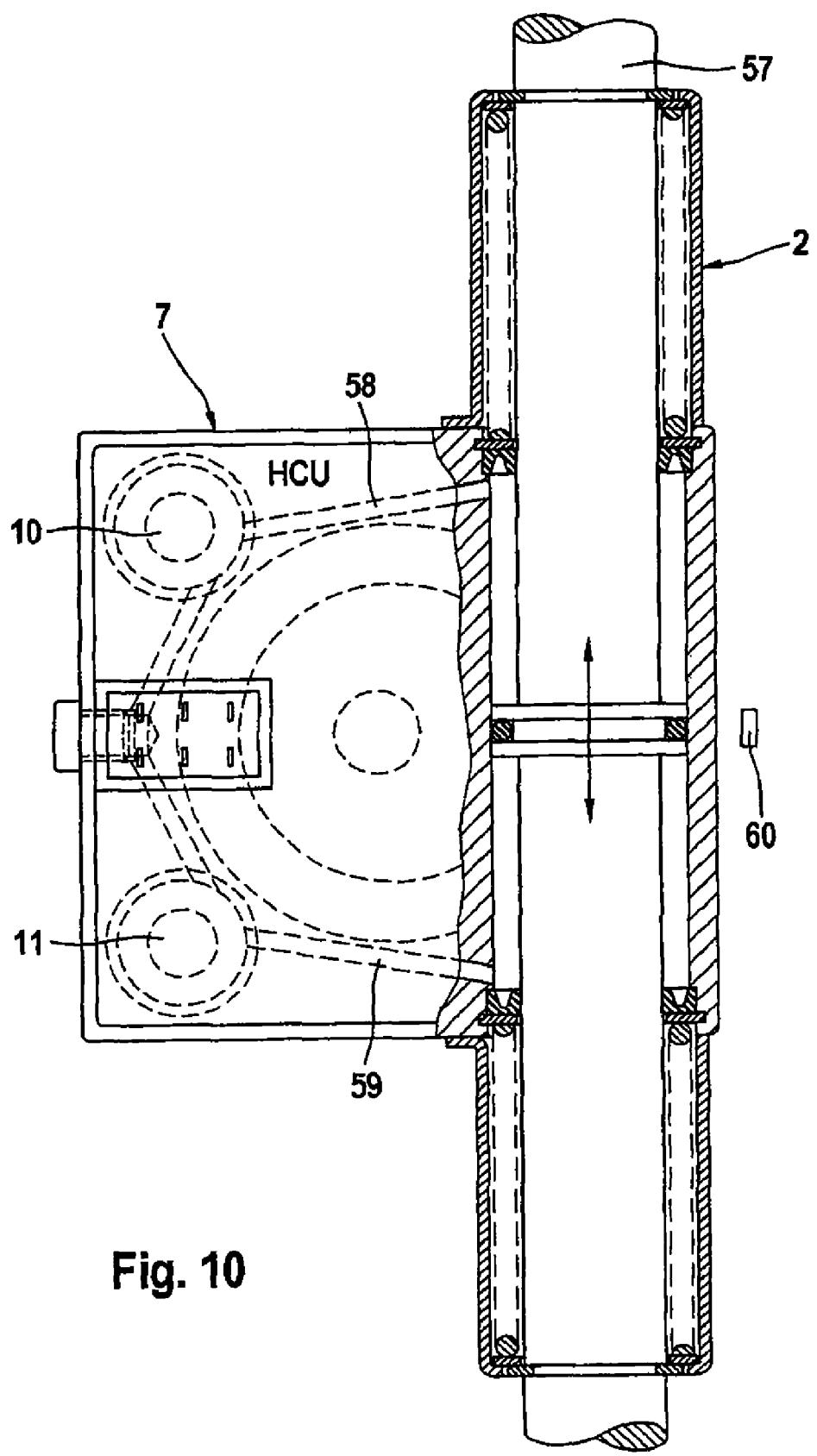
FIG. 10 shows a partial section through an assembly for a control system with an integrated actuator according to FIG. 9.

FIG. 10 illustrates the assembly 7 according to FIG. 9 in section, in which case the hydraulic lines 58, 59 are also provided for supplying the actuator 2, and the actuator 2 itself is provided integrated on or in the HCU.

Figure 11:
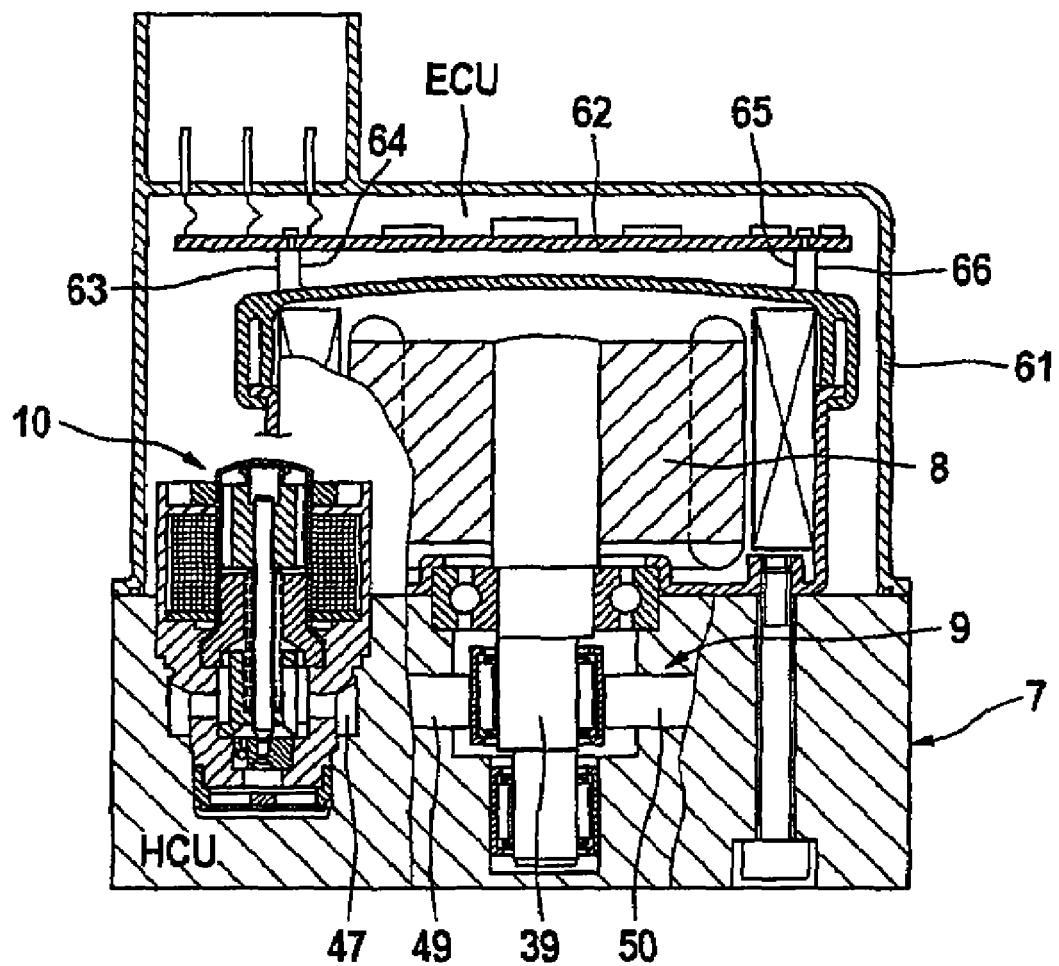
FIG. 11 shows a section through a compact assembly for a control system.

FIG. 11 shows in section a particularly compactly integrated design of an assembly 7. The hydraulic control unit HCU accommodates the high pressure pump 9 and the electrohydraulic valves 10, the valve domes and coils of which are located on the electric motor 8 side. A housing 61 of the electronic control unit ECU engages over the electric motor 8 and the valves 10. The electronic components of the ECU are arranged on a circuit board 62 which is attached to its housing 61. The supply between the motor 8, valves 10 and ECU is provided via integrated feed lines 63, 66.

FIG. 12 is a schematic illustration of a delivery flow V of a high pressure pump 9 with variable synchronization for a plurality of rotational crank angles (stages). The activation of the valves is carried out with variable synchronization with the object of controlling the pressure p and volume flow V taking into account different output levels. For this purpose, the activation of two control valves SO1, SO2 (10, 11) which are open in the currentless state and which act as intake valves or pressure valves is clarified for different rotational crank angles I-IV including a top dead center (OT) and a bottom dead center (UT) of the eccentric drive 39. In this context, linear delivery diagrams are illustrated which, in the case of a control system 1, illustrate the delivered volume flow as a function of the pressure. In order to fill an actuator 2 (wheel brakes R1-R4) according to diagram I, a high volume flow with low pressure is achieved by the synchronization of the valves 10, 11. As the pressure level rises, the delivery volume is reduced in accordance with diagrams II and III to ⅔ or ⅓ of the original volume flow V. Phase IV illustrates further improved, continuous control in which the different linear diagrams are implemented, as it were, in the manner of a curve.

Figure 13:
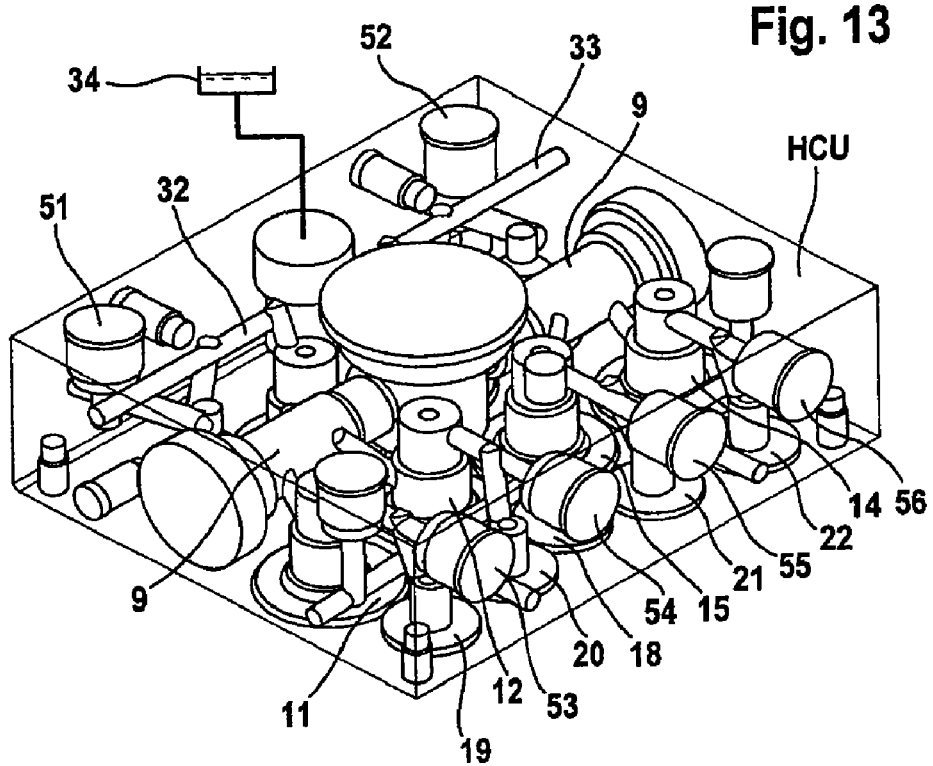
FIGS. 13 & 14 show perspective and semi-transparent views of a receiving body of an assembly for a dual-circuit control system.
Figure 14:
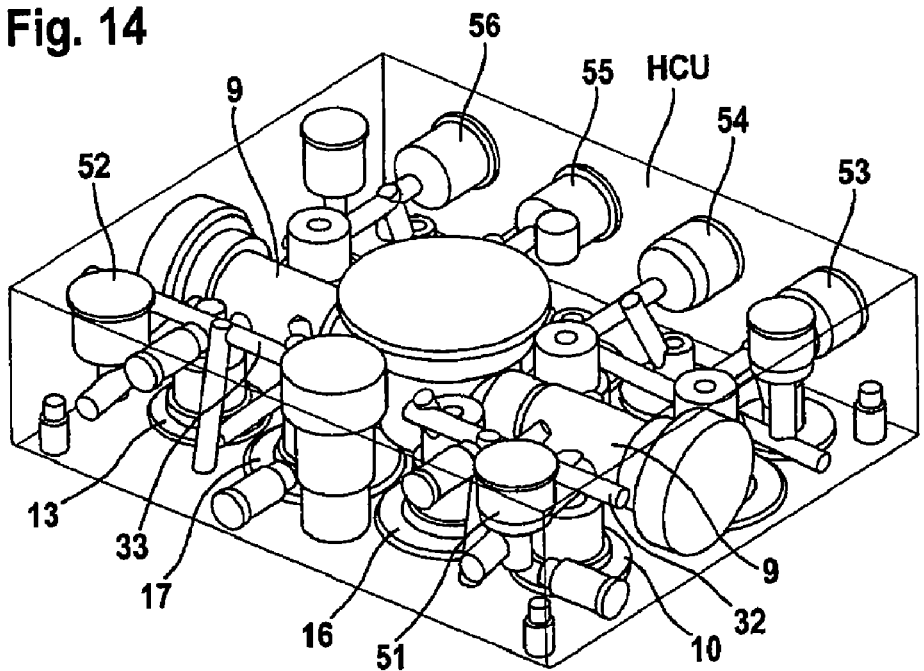
Figure 15:
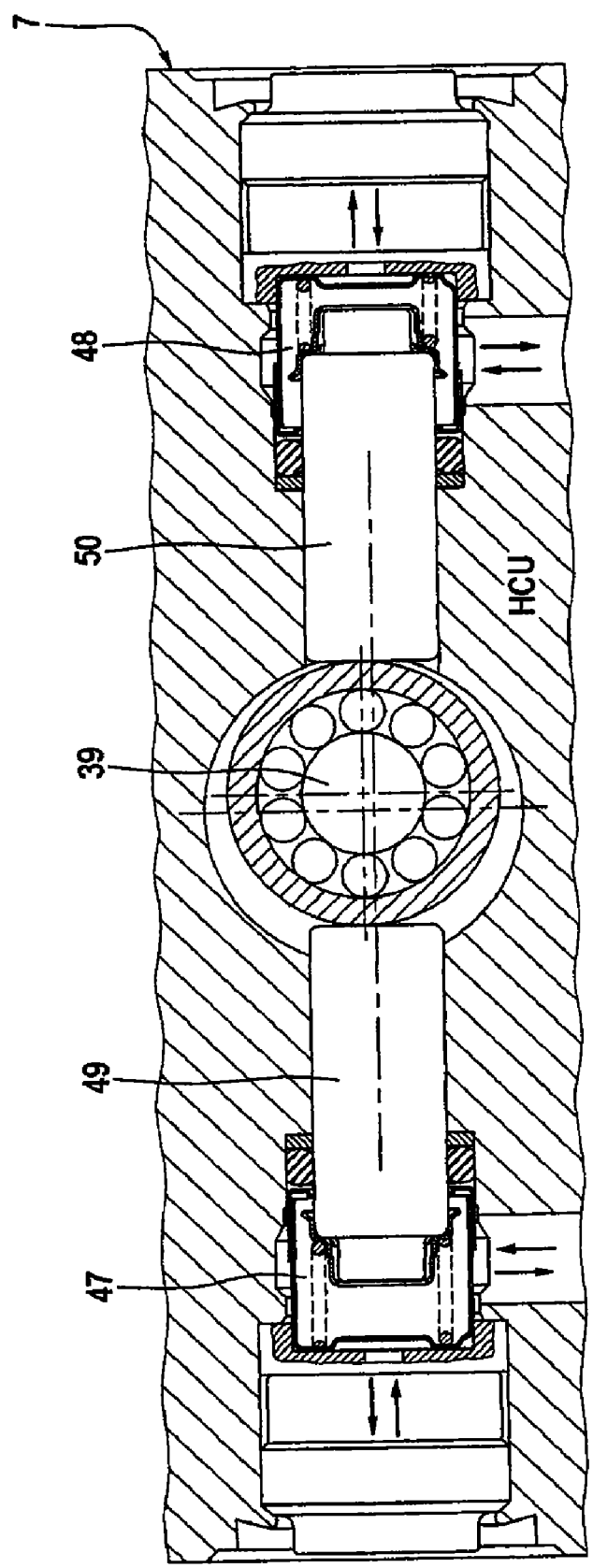
FIG. 15 shows a reversible, controllable high pressure pump for a dual-circuit control system in section.

FIGS. 13 and 14 clarify by way of example a specific bore in a receiving body of a hydraulic control unit HCU for a high pressure pump 9, as can be seen in section and in more detail from FIG. 15, and in which case components and features which correspond to the explanations above are identified by identical reference numerals.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. An electrohydraulic control system for the actuation of at least one actuator comprising:
   an electronic control unit (ECU);
   an electric motor which is configured to be activated by the electronic control unit (ECU) for driving a high pressure pump, and
   a receiving body for receiving electrohydraulic valves, channels and the high pressure pump which is connected, via a hydraulic connection, to a pressure transducer, a vessel, or both a pressure transducer and a vessel, wherein the high pressure pump is further configured to be connected to a pressure space of the actuator,
   wherein the electrohydraulic valves and the electric motor are networked to the electronic control unit (ECU),
   wherein the ECU is operable to control at least one pair of electrohydraulic valves via the network in order to (i) ventilate the high pressure pump by connecting the high pressure pump with the vessel, and (ii) control the volume flow to the actuator, pressure to the actuator, or both the volume flow to the actuator and the pressure to the actuator, by connecting the high pressure pump with the pressure space of the actuator.

2. The electrohydraulic control system as claimed in claim 1, wherein the hydraulic connections and the electrohydraulic valves are arranged in lines and line sections for commutating the high pressure pump can alternately be functionally connected as an intake path or as a pressure path.

3. The electrohydraulic control system as claimed in claim 2 further comprising means for electronically controlled synchronization which permit electrohydraulic commutation of the intake path and pressure path of the high pressure pump.

4. The electrohydraulic control system as claimed in claim 3, wherein the synchronization means permit variable ventilation for control of the electrohydraulic valves with offset timing, synchronized with one another in the manner of a phase controller.

5. The electrohydraulic control system as claimed in claim 1, wherein the hydraulic control system is connected to one or more sensors in order to permit automated extraneous actuation, and wherein the assembly has at least one man/machine interface (MMS) and a pressure transducer in order to permit user-dependent actuation.

6. The electrohydraulic control system as claimed in claim 5, wherein the electrohydraulic control system has a currentless fail safe mode, wherein in a the currentless fail safe mode the driven actuator is connected hydraulically to the pressure transducer using switching valves which are open in the currentless state.

7. The electrohydraulic control system as claimed in claim 5, wherein the one or more sensors are pressure sensors, rotation sensors or both pressure sensors and rotation sensors.

8. The electrohydraulic control system as claimed in claim 1, wherein the electrohydraulic valves are provided as intake valves and pressure valves of the high pressure pump, and wherein the electrohydraulic valves are embodied as control valves with a valve seat and with a valve body.

9. The electrohydraulic control system as claimed in claim 8, wherein the electrohydraulic valves have an open position, a closed position and at least one partially open position with a reduced opening cross section.

10. The electrohydraulic control system as claimed in claim 1, wherein the electronic control unit (ECU) includes an integrated power output stage for supplying electricity to the electrohydraulic valves.

11. The electrohydraulic control system as claimed in claims 10, further comprising coordination means to provide electronically coordinated actuation of the power output stage using at least one pressure sensor for the purpose of controlling the high pressure pump.

12. The electrohydraulic control system as claimed in claim 1, wherein an eccentric drive is provided between the electric motor and the high pressure pump.

13. The electrohydraulic control system as claimed in claim 12, wherein the eccentric drive is a rot/trans transducer.

14. The electrohydraulic control system as claimed in claim 1, wherein the high pressure pump is embodied as an expeller pump having at least one expulsion space.

15. The electrohydraulic control system as claimed in claim 14, wherein the expeller pump is a radial piston pump.

16. The electrohydraulic control system as claimed in claim 1, wherein the electronic control unit (ECU) includes an integrated power output stage for supplying modulated direct current or for supplying three-phase current to the electric motor.

17. The electrohydraulic control system as claimed in claim 1, further comprising an electronic commutation device for the electric motor, wherein the electronic commutation device is integrated into the electronic control unit (ECU).

18. The electrohydraulic control system as claimed in claim 1, wherein a direction of (i) a rotation reversing device, (ii) a rotational speed control device, (iii) a rotational speed sensing device, (iv) or any combination thereof, are assigned to the electric motor.

19. The electrohydraulic control system as claimed in claim 1, wherein by the integration of the hydraulic control system into an electronic motor vehicle control system, and in that the electronic control unit (ECU) of the hydraulic control system is electronically networked to further electronic control units of a motor vehicle.

20. The electrohydraulic control system as claimed in claim 1 further comprising a plurality of hydraulic circuits which are independent of one another.

21. The electrohydraulic control system as claimed in claim 1, wherein the pressure transducer, the actuator or both the pressure transducer and the actuator are attached to a hydraulic control unit (HCU).

22. The electrohydraulic control system as claimed in claim 1, wherein the at least one actuator is a piston-cylinder assembly of a motor vehicle.

23. The electrohydraulic control system as claimed in claim 1 integrated into a system (i) for controlling vehicle stability, (ii) for controlling brakes, (iii) for controlling a handbrake, (iv) for controlling steering, (v) for controlling ride level, (vi) for controlling a manual shift transmission or automatic transmission, (vii) for relative adjustment of chassis components, or (viii) for the combined networked control of at least two of the abovementioned functions (i) through (viii).

* * * * *